Oct. 10, 1950 F. W. HINES 2,524,909
ARMREST FOR AUTOMOBILES
Filed July 11, 1946
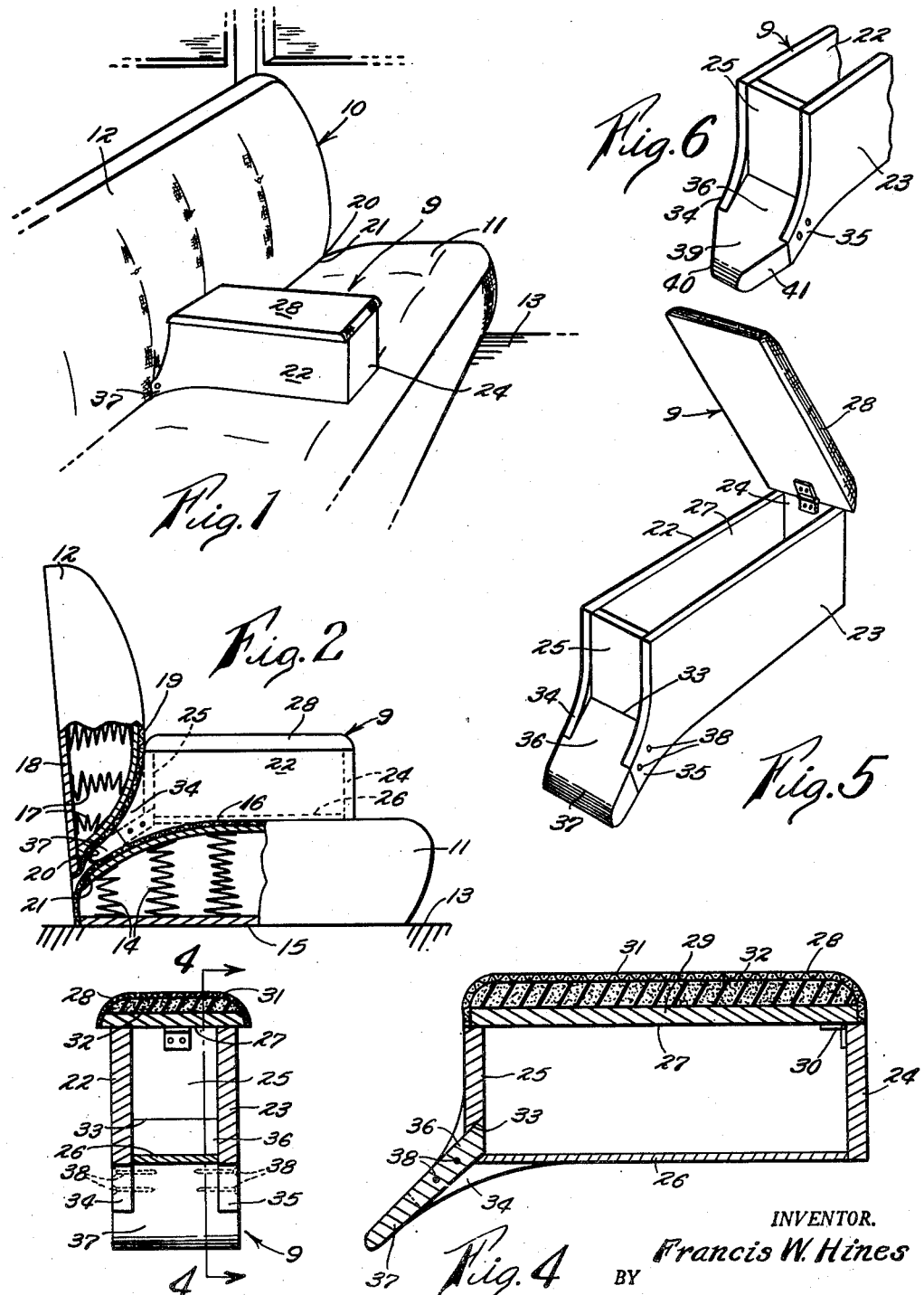
INVENTOR.
Francis W. Hines
BY
Murray, Sachhoff & Paddock
ATT'YS Patented Oct. 10, 1950

2,524,909

UNITED STATES PATENT OFFICE 2,524,909

ARMREST FOR AUTOMOBILES

Francis W. Hines, Oklahoma City, Okla.

Application July 11, 1946, Serial No. 682,825

1 Claim. (Cl. 155—112)

The present invention relates to improvements in arm rests for automobile seats, or the like, and is particularly directed to a novel means for securing accessories of this kind in selective, transverse positions upon said automobile seats.

It is therefore an object of the invention to provide a simplified means for associating an arm rest with conventional automobile seat structures so that said rest may be readily attached or removed from the seat and in operative position is secured thereto against lateral and longitudinal displacement by a tongue depending rearwardly from the rest and secured between the back and seat by their opposed yieldable pressures.

It is another object of the invention to provide an arm rest which is adaptable to the seat constructions in all styles of present day automobiles and which may be manufactured, in its preferred or modified form, at a relatively low cost.

It is a further object of the invention to provide an accessory of the foregoing character which has a simplified means for effectively positioning it upon an automobile seat.

Other objects will be apparent from the following specification and drawing wherein:

Fig. 1 is a fragmental perspective view showing my arm rest in operative position upon an automobile seat.

Fig. 2 is a side elevational view of the arm rest shown in Fig. 1, the seat construction being illustrated in cross-section.

Fig. 3 is an enlarged cross-sectional view taken transversely through my arm rest.

Fig. 4 is a cross-sectional view taken on line 4—4 of Fig. 3.

Fig. 5 is a perspective view of the arm rest.

Fig. 6 is a fragmental perspective view of a modified form of seat mounting means for the device illustrated in Figs. 1–5.

With particular reference to the drawings, wherein like reference numerals indicate similar parts, Fig. 1 shows my arm rest 9 associated with a conventional automobile seat 10 having a continuous, straight seat 11 and a straight, continuous back 12. As clearly illustrated in Fig. 2 the seat 11 is secured upon a floor 13 of the vehicle and has a number of springs 14 extending between a frame member 15 and a flexible, padded upholstery material 16 to give a resilient cushioning effect thereto. In like manner the back 12 for the seat may consist of a series of springs 17 mounted to a back frame 18 and engaging at their free ends a padded upholstery material 19 to provide a resilient back for the seat. It will be understood that the lower transverse portion 20 of the back is normally in resilient abutment with the upper rear longitudinal portion 21 of the seat 11.

My arm rest 9 includes a box-shaped structure having opposed side walls 22 and 23 which are held in spaced relationship by a front wall 24 and a rear wall 25. The box preferably has a bottom 26 and an open top 27, the latter being covered by a hinged closure 28. The closure may comprise a panel 29 pivoted to the upper end of the front wall by a suitable hinge 30, said panel being covered with a fabric upholstery 31 beneath which is inserted a suitable padding 32.

As most clearly illustrated in Figs. 3, 4 and 5, the back wall 25 of my arm rest is foreshortened, its bottom edge 33 terminating short of the bottom of the rest. Rearwardly depending projections 34 and 35 are formed on the side walls 22 and 23 respectively of the arm rest and receive between them the reduced upper end 36 of a solid, imperforate tongue member 37 which depends rearwardly from the free ends of said projections. The upper edge of the reduced end 36 of the tongue overlaps the lower edge 33 of the rear wall and said tongue is fixed to my arm rest by means of nails 38 which are driven transversely through the projections on the side walls and into the body portion of the reduced end 36 of said tongue. With particular reference to Figs. 4 and 5 of the drawing it will be noted that the lower free end of the tongue member 37 is wedge-shaped so that it may be inserted between the yieldable adjacent portions of the seat 11 and back 12 at a selected position across the transverse extent of the seat.

The arm rest shown and described with reference to Figs. 1 to 5 inclusive is particularly adapted to automobile seats which have straight or continuous backs and seat portions. The modified form of my invention illustrated in Fig. 6 shows a tongue 39 which has tapered sides 40 and 41 so that my rest may be associated with automobile seats which have straight seat portions and pivotally mounted, divided back sections. The pivotal mounting for these divided backs is generally located centrally of the transverse extent of the back so that an occupant may be comfortably seated on either side of the division line. The tapered tongue portion of my device, illustrated in Fig. 6, provides a means for securely mounting my rest upon seats having divided backs in as near a central position thereon as possible so that the occupants may maintain their normal positions and also have the use of my arm rest.

In use the arm rest illustrated in Figs. 1 to 5 is placed upon the seat of an automobile having a straight back, or, the arm rest shown in Fig. 6 is placed upon an automobile seat having a divided back, so that either of said rests is supported upon the seat with its bottom in contact therewith. The tongue portion for either of the rests then extends in the direction of the resilient, meeting portions 21 and 20 of the seat 11 and the back 12 respectively, and upon manually instituted longitudinal movement of the rest toward the back, the tongue is inserted between the meeting edges of the seat and back and is secured therebetween by their resilient, cooperative actions, thereby mounting the rest in fixed position upon the seat.

It is to be understood from the foregoing that I have illustrated and described a preferred embodiment of my invention and that numerous modifications can be made therein without departing from the spirit and scope of the appended claim. For instance I contemplate that the interior wall surfaces of my arm rest may be lined with a suitable fabric and the exterior wall surfaces may be upholstered in the usual manner. Furthermore, my arm rest may have a fixed top wall in place of the hinged closure illustrated or the bottom wall for said rest may be omitted from the construction.

What is claimed is:

As an article of manufacture an arm rest for an automobile seat comprising a box-shaped structure including a bottom, opposite side walls, a front and a rear wall interconnecting said side walls, and a closure means for the upper side of said structure, projections extending rearwardly from the lower ends of the side walls, and a tongue member secured between the projections and depending rearwardly therefrom, said tongue member being wedge-shaped at its lower end.

FRANCIS W. HINES.

REFERENCES CITED

The following references are of record in the file of this patent:

UNITED STATES PATENTS

| Number | Name | Date |
| --- | --- | --- |
| 1,999,560 | Brueckel | Apr. 30, 1935 |
| 2,086,244 | Smith | July 6, 1937 |
| 2,160,282 | Rehg | May 30, 1939 |
| 2,296,628 | Coppock | Sept. 22, 1942 |